E. ROSENBERGER.
AUTOMOBILE.
APPLICATION FILED JAN. 7, 1915.
1,174,449.
Patented Mar. 7, 1916.
3 SHEETS—SHEET 1.
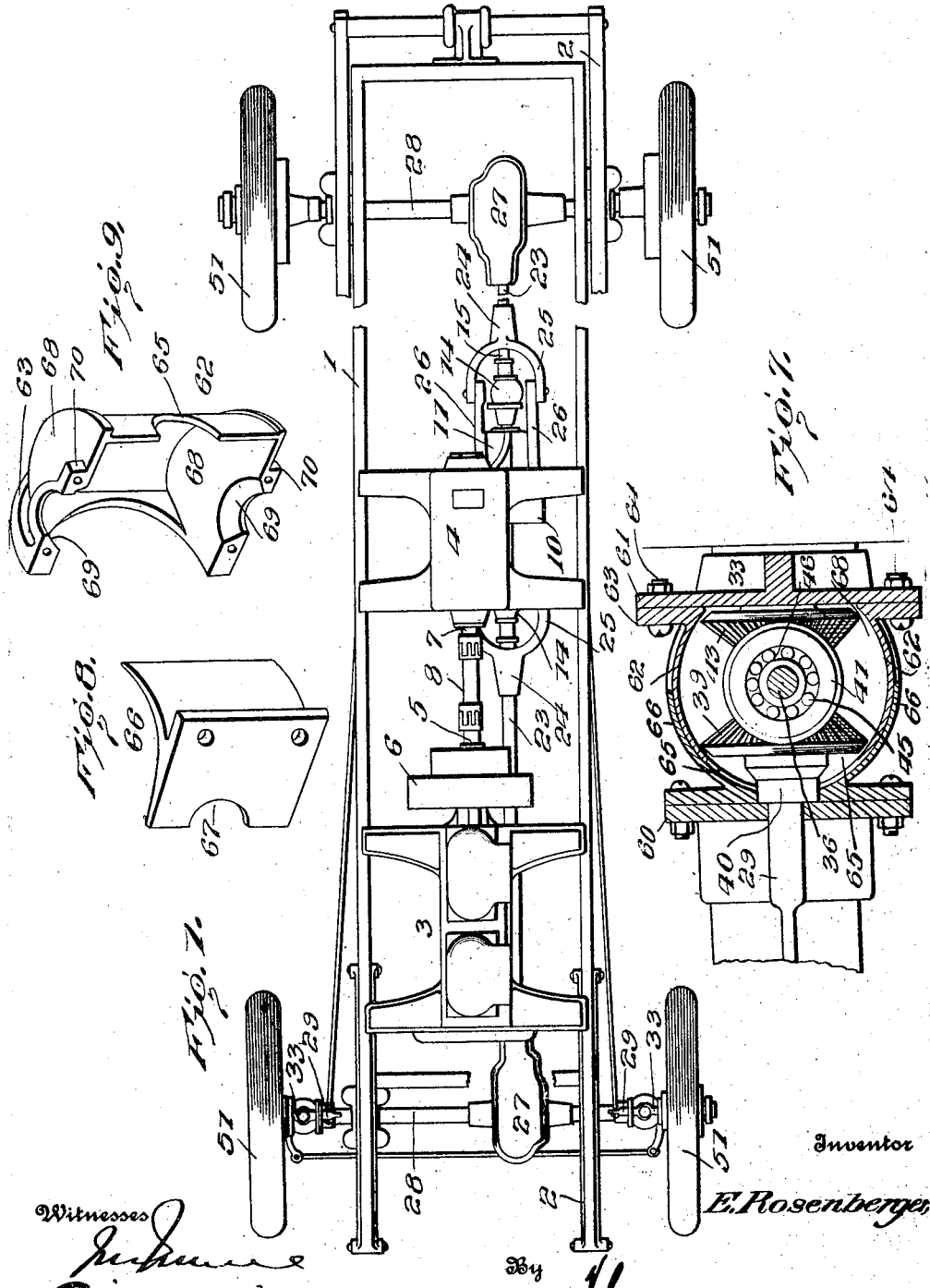

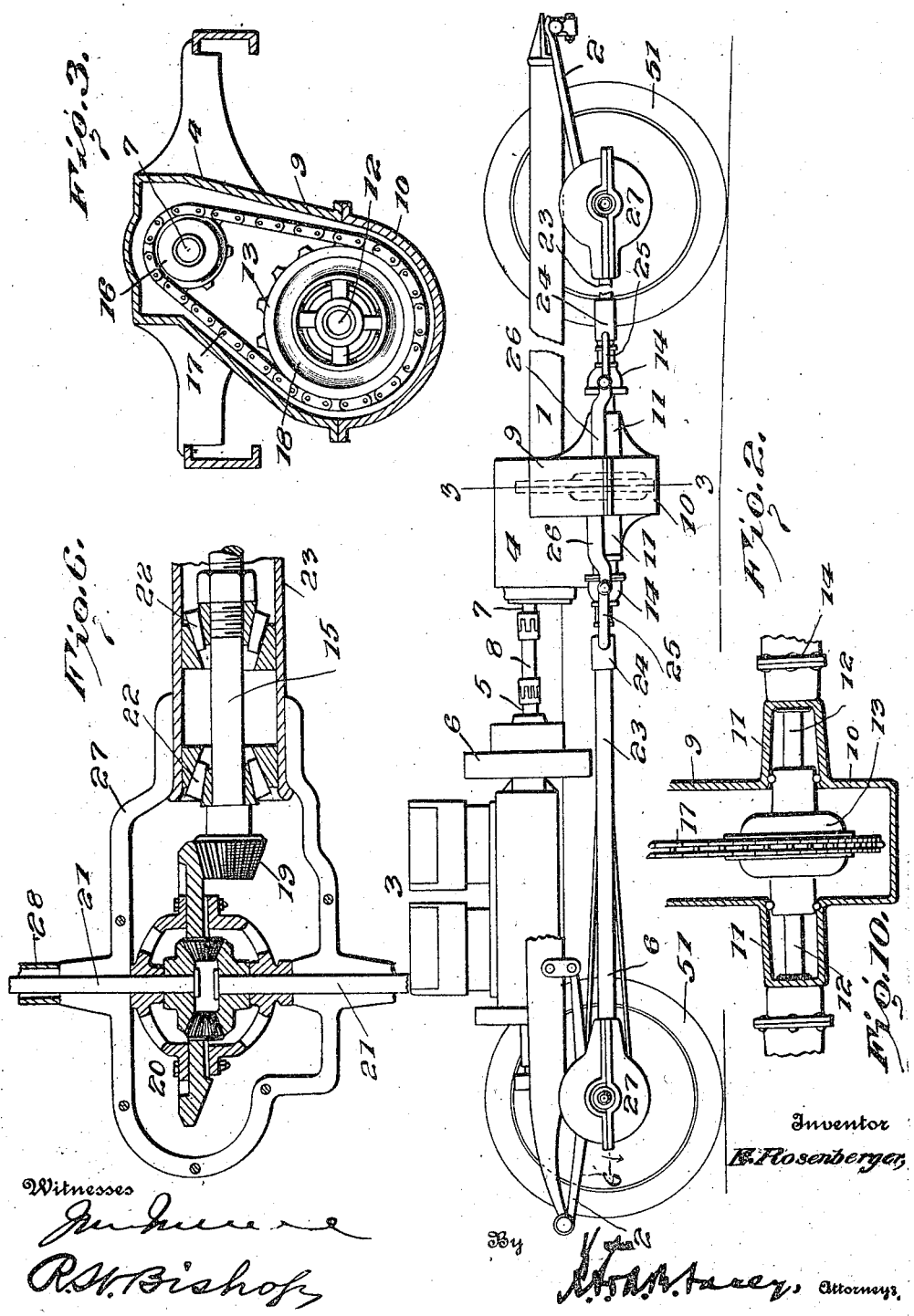

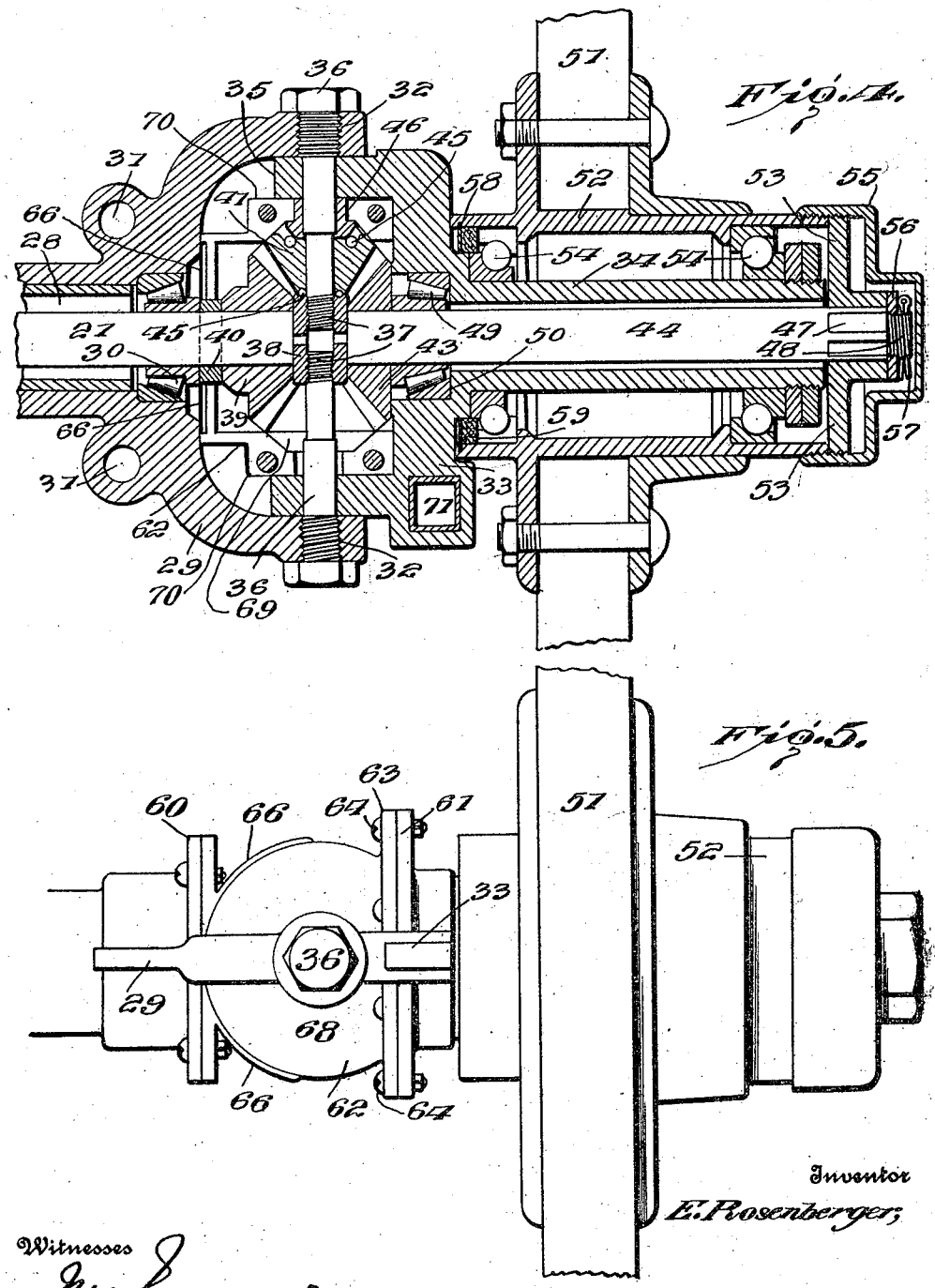

UNITED STATES PATENT OFFICE.

ERNST ROSENBERGER, OF MANKATO, MINNESOTA.

AUTOMOBILE.

1,174,449. Specification of Letters Patent. Patented Mar. 7, 1916.

Application filed January 7, 1915. Serial No. 999.

*To all whom it may concern:*

Be it known that I, ERNST ROSENBERGER, a citizen of the United States, residing at Mankato, in the county of Blue Earth and State of Minnesota, have invented certain new and useful Improvements in Automobiles, of which the following is a specification.

This invention relates to automobiles, and has special reference to the means for propelling and steering the same.

The object of the invention is to provide novel mechanism whereby the power may be applied to both the front and rear axles of the vehicle.

Other objects of the invention are to provide improved mountings for the wheels; to provide novel means for effecting rotation of the wheels, and to provide improved mountings for the several shafts and trains of gearing.

The several stated objects and such other incidental objects as will appear from the following description are attained in a mechanism such as is illustrated in the accompanying drawings, and the invention resides in certain novel features which will be particularly pointed out in the claims following the description.

In the drawings: Figure 1 is a plan view of an automobile frame showing my improved driving and steering mechanism mounted thereon; Fig. 2 is a side elevation of the same; Fig. 3 is a transverse section on the line 3—3 of Fig. 2; Fig. 4 is a section taken longitudinally through the hub of one of the wheels and the parts immediately adjacent the hub; Fig. 5 is a plan view of the parts shown in Fig. 4; Fig. 6 is a horizontal section on the line 6—6 of Fig. 2; Fig. 7 is a detail sectional plan view of the gearing connecting the driving shaft with the ground wheel; Figs. 8 and 9 are detail perspective views of members of the housing by which the gearing just mentioned is inclosed; and Fig. 10 is a detail longitudinal section through the transmission gear case.

In carrying out my present invention, I employ a frame 1 which may be of any approved construction and to which the front and rear axles are connected by springs 2 or any other preferred form of suspension. A motor, indicated conventionally at 3, is mounted upon the frame and a transmission gear case 4 is provided upon the frame preferably in rear of the motor. A power shaft 5 is mounted in and extends from the clutch casing 6 and is driven directly by the motor, as will be readily understood. A transmission shaft 7 is mounted in the transmission case 4 and a coupling 8 connects the said shaft with the power shaft 5, as will be readily understood. As shown most clearly in Fig. 3, the gear case 4 is constructed in two parts which are provided with flanges at their meeting edges through which bolts or other fastenings are inserted to secure the two parts together. The upper part or member of this case is secured in any desired manner directly to the frame 1 and has a depending tubular portion 9 to the lower end of which the lower member 10 is secured. Front and rear longitudinal extensions or sleeves 11 are provided upon the gear case and these extensions constitute bearings for longitudinal shafts 12 which, at their inner ends, are connected through differential gearing, indicated at 13, and are connected at their outer ends through universal joints at 14 with longitudinal transmission shafts 15. A sprocket wheel 16 is secured upon the shaft 7 within the gear case 4 and a chain 17 is trained around the sprocket wheel and a larger sprocket wheel 18 which is housed within the lower portion of the gear case and forms the central member of the differential gear 13. By this arrangement, motion is transmitted from the power shaft of the engine through the shaft 7 and the sprocket gearing to the differential gear by which it is imparted directly to the longitudinal shafts 15. At the inner ends of the sleeves 11, I provide ball bearings 111 for the differential gearing whereby said gearing is retained in its proper position. The master gears of the differential are provided with angular sockets in their hubs to receive the angular ends of the shafts 12, said shafts being inserted through the opposite sides of the casing, as will be readily understood. The universal joints 14 are secured to the outer ends of the shafts 12 and roller bearings for said shafts may be provided at the outer ends of the sleeves 11.

The longitudinal shafts 15 extend to the front and rear of the vehicle and are respectively equipped at their front and rear ends with pinions 19, by which the motion is imparted to the differential gearing 20 on the respective transverse driving shafts 21. The shafts 15 are carried at their front and rear extremities in bearings 22 fitted in the front ends of sleeves or housing 23 extending longitudinally of the machine and having their inner ends rotatably fitted in sleeves 24 which are carried by yokes 25 pivoted to arms or brackets 26 projecting from the front and rear ends of the gear case 4. This arrangement will hold the several shafts in longitudinal alinement while, at the same time, permitting the same to readily accommodate themselves to unevenness in the surface over which the vehicle is traveling. The front and rear ends of the forward and rear sleeves or housings 23, respectively, are secured to the gear casings or housings 27 which inclose all the members of the differential gearings on the respective axles and are so constructed as to completely and effectively inclose the said gearing to permit the same to run in oil. The said gear casings provide bearings for the transverse driving shafts 21 and are secured rigidly to the front and rear axles 28 inclosing the said shafts, as will be readily understood. The axles 28 are, of course, tubular and at the outer end of each of the front axles, I provide a yoke 29 and antifriction bearings, indicated at 30, are provided around the shaft extending through the axle and at the center of the said yoke or bracket to insure easy running of the machine. This yoke or bracket is provided with openings 31 above and below the axle to receive radius rods and the extremities of the yoke are provided with internally threaded openings, indicated at 32. A mating yoke 33 is provided at the inner end of the tubular spindle 34, and this mating yoke has its extremities 35 adapted to enter between the extremities of the yoke 29 and is equipped with openings adapted to register with the openings 32. Bolts 36 are inserted through the said openings and are provided with externally threaded portions adapted to engage the openings 32 whereby the said bolts will be secured in place, the intermediate portions of the bolts being of reduced diameter and having smooth exteriors whereby they will serve as pivots about which the yoke 33 and the parts carried thereby may swing in a horizontal plane. The inner extremities of the bolts are also threaded, as shown at 37, and these inner threaded extremities are connected by a turn-buckle 38 so that the accidental or premature withdrawal of the bolts will be prevented and the parts may be held firmly in the proper spaced relation. A beveled gear wheel 39 is mounted upon the outer end of the transverse driving shaft 21, as shown clearly in Fig. 4, and a collar or similar spacing device 40 may be fitted around the shaft between the said gear wheel and the bearing 30 so as to prevent loosening of the bearing and insure the accurate adjustment of the several parts.

A beveled gear wheel 41 is mounted loosely upon one of the bolts 36 and meshes with the gear wheel 39, while a beveled gear wheel 43, similar to the wheel 39, is secured upon the inner end of the shaft 44 and meshes with the wheel 41. Ball bearings 45 are provided for the gear 41, and a cone 46 is mounted upon the bolt 36 to retain the outer bearing balls in their proper position. The shaft 44 extends through the tubular spindle 34 and is provided at its outer extremity with an angular portion 47 and a threaded terminal 48. Roller bearings 49 are provided around the inner portion of the said shaft 44 between the gear 43 and a central chamber or recess 50 in the bracket or yoke 33 so that the shaft may turn easily within the said bracket and the spindle.

The ground wheels 51 are each provided with a hub 52 which encircles the tubular spindle 34 and is connected with the shaft 44 by a clutch member 53 having an angular central opening which engages the angular portion 47 of the shaft 44 and is provided at its outer edge with ribs or other devices by which it will have an angular engagement with the outer extremity of the hub. Antifriction bearing 54 are provided between the hub and the spindle and a hub cap 55 is fitted externally upon the outer extremity of the hub and extends over the clutch member 53 and the end of the shaft 44 so as to protect the parts against the entrance of dust or other foreign matter. A nut 56 may be fitted upon the threaded terminal 48 of the shaft 44 so as to prevent dislodgment of the clutch member 53, and a cotter-pin or other locking device 57 may be applied to the said threaded terminal beyond the nut 56 so as to prevent loosening of the said nut. In the inner end of the hub 52, I provide a metal dust cap or washer 58 which may be sprung or otherwise fitted into the end of the hub and, between the bearings 54 and the said cap or washer, I provide a felt or similar washer 59, this construction serving to retain oil within the hub to lubricate the bearings and to prevent the entrance of dust or other deleterious matter to the bearings.

The brackets or yokes 29 and 33 are provided with lateral extensions or flanges 60 and 61, respectively, and to the said flanges, I secure the members of a housing which fit around the gears 39, 41 and 43 so as to completely inclose the same and thereby protect them against dirt and permit them to run in oil. This housing comprises a pair of similar members 62 which are of arcuate form and are provided with outstanding flanges 63 through which and the flanges 61 bolts 64 may be inserted to secure the said members in place. The free edges of these members 62, by which term I mean to designate those edges remote from the flanges 63, will come together about the driving shaft 21 when the parts are in position, and to accommodate the said shaft and permit movement of the members in the steering of the vehicle, notches or slots 65 are formed therein to permit the members to move past the shaft, as will be readily understood. The members 66 of the housing are secured to the flanges 60 of the yoke 29. These members 66 fit over the members 62 and constitute a cover for the slots or notches 65 whereby the entrance of dirt into the housing or the escape of oil therefrom will be prevented in all positions of the apparatus. The members 66 are extended inwardly in the plane of the securing flanges thereon so that they will fit between the members 62 and the face of the bracket 29, and notches 67 are formed in the said inner edges of these members to fit around the shaft 21 or the collar 40 thereon. I thus effectually guard against the presence of any openings through which the oil may escape. The members 62 are extended inwardly at their upper and lower edges so as to provide top and bottom plates 68 which are fitted over the gear 41 and under the gears 39 and 43, and the inner edges of these top and bottom plates 68 are recessed, as shown at 69, to accommodate the cone 46. Flanges 70 are provided upon the top and bottom of the said members 62 through which securing bolts are inserted to secure the members firmly together around the cone 46 or the bolts 36. It will thus be seen that the gearing connecting the driving shaft 21 with the shaft 44 is completely inclosed and the housing may be filled with oil so that the said gears will be effectually and constantly lubricated.

The yoke 33 is provided with an opening 71 in its lower portion to receive a steering arm whereby the ground wheels and the yokes may be turned about the bolts 36 as a center so as to steer the vehicle to one or the other side.

It will be readily understood from the foregoing description, taken in connection with the accompanying drawings, that I have provided a simple mechanism whereby the driving power may be applied to all the wheels of the vehicle so that the same may be very effectually and positively driven, and that the steering of the vehicle is not affected by the propelling mechanism employed. All the working parts are inclosed so that they may be permitted to run in oil and thereby thoroughly lubricated, and the provisions of universal joints and differential gears, arranged as shown and described, permits the ground wheels to readily pass over obstructions in the road or an uneven surface without affecting the propulsion of either pair of wheels or throwing any of the working parts out of their operative positions.

It will be readily noted that I have provided differentials at various points in the trains of gearing so that none of the moving parts can bind in any position of the machine and the machine may be driven around sharp corners safely without losing headway.

By applying the driving power to the front, as well as to the rear wheels, the power generated in the motor is very efficiently and economically utilized and the machine may be easily driven over rough or soft roads or through sand. With the ordinary type of automobile in which the power is applied to the rear wheels only, the front wheels tend to dig into the ground, but with my improved mechanism this tendency is overcome and the propelling strain is distributed through the entire mechanism and wear on the tires is reduced. In the ordinary arrangement, only one wheel is working effectually when the machine is turning a corner, whereas two wheels will be working with my machine under similar conditions.

Having thus described the invention, what is claimed as new is:—

1. The combination of a hollow axle, a driving shaft mounted in said axle, a yoke carried by the end of said axle, a tubular spindle, a yoke carried by the end of said spindle and having its ends fitting between the ends of the first-mentioned yoke, a transmission shaft mounted in the spindle, pivot bolts threaded into the ends of the first-mentioned yoke and having their inner portions reduced and smooth, gear wheels on the ends of the driving and transmission shafts, a gear wheel mounted on the intermediate portion of one of the pivot bolts and meshing with the gear wheels on the shafts, the inner extremities of the pivot bolts being threaded, and a coupling engaging the said inner extremities of the pivot bolts whereby to adjustably connect the same.

2. The combination of a frame, a hollow axle connected therewith, a yoke at the outer end of said axle, a second yoke having its ends arranged in overlapping relation to the first-mentioned yoke, a tubular spindle projecting from said second yoke, a ground wheel rotatably mounted upon the tubular spindle, a driving shaft mounted in the hollow axle, a transmission shaft mounted in the tubular spindle, means for rigidly connecting the transmission shaft with the ground wheel, pivot bolts inserted through the overlapping ends of the two yokes to pivotally connect the same, gear wheels mounted on the adjacent ends of the driving shaft and the transmission shaft, an intermediate gear wheel mounted loosely on one of the pivot bolts and meshing with the gear wheels on both said shafts, and an adjustable connection between the inner ends of the pivot bolts retaining said intermediate gear wheel and all the parts in assembled relation.

3. The combination of a hollow axle, a driving shaft extending through said axle, a tubular spindle supported from the axle and arranged to swing in a horizontal plane, a transmission shaft mounted within said spindle, a ground wheel rotatably mounted upon the said spindle and connected with the transmission shaft, gearing connecting the adjacent ends of the driving shaft and the transmission shaft, and a housing comprising members disposed at the sides of and meeting in the vertical plane of and connected with the tubular spindle and the hollow axle respectively, the members connected with the tubular spindle inclosing the gearing in all positions of the spindle and the members connected with the hollow axle fitting closely over the members connected with the spindle.

4. The combination of a hollow axle, a yoke carried by the end of said axle, a second yoke, a tubular spindle projecting from the said yoke, pivot bolts extending through the ends of said yokes, a driving shaft mounted in the hollow axle, a transmission shaft mounted in the tubular spindle, a ground wheel rotatably mounted on the spindle and connected with the transmission shaft, intermeshing gears mounted on one of the pivot bolts and the adjacent ends of said shafts whereby motion will be transmitted from the driving shaft to the transmission shaft, and a housing secured to and disposed within the said yokes and entirely inclosing the said gearing, said housing comprising mating members rigidly secured to and within the respective yokes and the mating members secured to the spindle carrying yoke being constructed with top and bottom plates extending above and below the gearing and fitting around the pivot bolts above and below the gearing, and fastening devices inserted through said top and bottom plates respectively, whereby the said mating members will be secured to each other.

5. The combination of a hollow axle, a driving shaft mounted therein, a yoke at the end of said axle, said yoke having laterally extending flanges, a second yoke also provided with laterally projecting flanges, a tubular spindle projecting from said second yoke, a transmission shaft extending through said spindle, a ground wheel rotatably mounted on the spindle and connected with the transmission shaft, pivot bolts inserted through the ends of the two yokes, intermeshing gearing carried by said pivot bolts and the adjacent ends of the shafts, and a housing comprising mating members secured to the flanges of the second yoke and to each other about the pivot bolts above and below the said gearing, said members being provided with notches at their meeting edges to fit over the driving shaft, and other members secured to the flanges of the yoke on the axle and having notches in their meeting edges whereby they may fit closely together about the driving shaft and having lateral curved wings extending over the notches in the first-mentioned members.

6. The combination of alined shafts, gearing connecting said shafts and permitting a pivotal movement of one shaft relative to the other shaft, supports for the shafts, housing members secured to the support for the pivotally movable shaft and comprising mating curved bodies fitting entirely around said gearing and having registering longitudinal notches in their meeting free edges to engage the non-pivoted shaft, said members having top and bottom plates extending respectively over and under the gearing, and secured together at their mating edges, and housing members secured to the support for the non-pivoted shaft and meeting around the said shaft and having laterally curved wings fitting closely upon the first-mentioned housing members and covering the notches therein in all positions of the same.

7. The combination of an axle, a yoke carried by the end of the axle, a spindle alined with the axle, a yoke carried by the inner end of the spindle and having its ends disposed between the ends of the first-mentioned yoke, pivots inserted through the ends of said yokes and extending inwardly beyond the same, a connection between the inner ends of said pivots, a driving shaft carried by the axle and projecting through the first-mentioned yoke, a transmission shaft carried by the spindle and projecting through the second-mentioned yoke, a ground wheel connected with and driven by the transmission shaft, gearing between the driving and transmission shafts and including a member mounted on one of the pivots, lateral flanges at both sides of each of said yokes, mating housing members having lateral flanges secured to and against the flanges of the yoke carried by the spindle, said members being constructed to fit together around the gearing and the pivots and provided with registering notches to fit around the driving shaft, fastening devices at the top and the bottom of the said members, and mating covering members secured to the flanges on the yoke carried by the axle and having curved wings fitting closely to the housing members and over the notches therein, said covering members being provided with notches in their meeting edges whereby they may fit close around the driving shaft.

In testimony whereof I affix my signature in presence of two witnesses.

ERNST ROSENBERGER. [L. S.]

Witnesses:
　BENJAMIN TAYLOR,
　LEONA T. BIER.